Figure 1A:
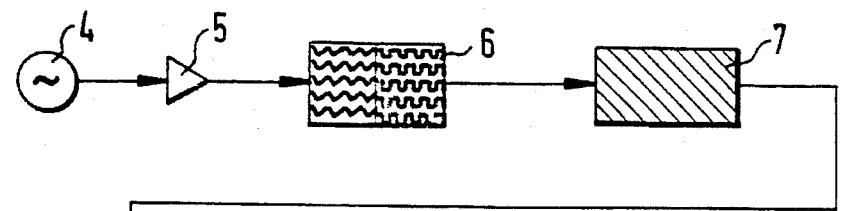

United States Patent
Brosow

Patent Number: 5,530,682
Date of Patent: Jun. 25, 1996

[54] METHOD AND APPARATUS FOR TRANSMITTING AN INFORMATION SIGNAL

[76] Inventor: Jörgen Brosow, A 5322 Hof, A-5322 Hof, Austria

[21] Appl. No.: 87,758
[22] PCT Filed: Dec. 27, 1991
[86] PCT No.: PCT/EP91/02514
§ 371 Date: Dec. 23, 1993
§ 102(e) Date: Dec. 23, 1993
[87] PCT Pub. No.: WO92/12581
PCT Pub. Date: Jul. 23, 1992

[30] Foreign Application Priority Data

Jan. 4, 1991 [DE] Germany .............. 41 00 134.6

[51] Int. Cl.⁶ .................................. H04B 11/00
[52] U.S. Cl. .................................. 367/134
[58] Field of Search ................... 367/131, 132, 367/133, 134; 340/850; 375/6

[56] References Cited

U.S. PATENT DOCUMENTS 3,742,440  6/1973  Ehrlich et al. .............. 367/134
3,806,862  4/1974  Chao .
3,958,215  5/1976  Bianco .
4,039,999  8/1977  Weston .
4,044,611  8/1977  Kaname et al. .............. 367/134
4,231,031  10/1980  Crowther et al. .

FOREIGN PATENT DOCUMENTS 2656969  7/1977  Germany .

OTHER PUBLICATIONS

Peter Zastrow "Fernsehempfangstechnik" .
ITT, Ultraschallsender und Empfänger.

Primary Examiner—Daniel T. Pihulic
Attorney, Agent, or Firm—Jacobson, Price, Holman & Stern

[57] ABSTRACT

An apparatus and improved method for transmitting an information signal. According to the improved method, an information signal is transmitted under water from a transmitter located at a first place to a receiver located distant therefrom at a second place. In performing the signal transmission, a modulated ultrasound carrier signal is delivered to the water and is formed with a fixed amplitude value in the transmitter. The modulation is performed by pulse duration modulating (with an information signal) the ultrasound carrier signal which, in turn, has a given frequency. The modulated ultrasound carrier signal is then picked up from the water and is demodulated in the receiver in order to recover the information signal. The improvement resides in performing the pulse duration modulation so that the modulated ultrasound carrier signal is modulated in the form of ultrasound pulses having the pulse leading edges thereof modulated with the information signal and having a fixed pulse amplitude below the cavitation limit of the transmission medium. The apparatus performs the improved method.

9 Claims, 1 Drawing Sheet

METHOD AND APPARATUS FOR TRANSMITTING AN INFORMATION SIGNAL

The invention relates to a method of transmitting an information signal under water from a transmitter located at a first place to a receiver located distant therefrom at a second place, wherein a modulated ultrasound carrier signal delivered to the water is formed with a fixed value of the amplitude in the transmitter by modulation of an ultrasound carrier signal of a given frequency with the information signal, and the modulated ultrasound carrier signal picked up from the water is demodulated in the receiver for recovering the information signal, as well as to an apparatus for carrying out this method.

In a known method of this type (DE-A-2 656 969) the rectangular ultrasound carrier signal obtained by a push-pull circuit of monostable multivibrators is frequency-modulated and, subsequently, converted in a final stage into a sine-shaped frequency-modulated output signal which is radiated to the water. The radiated modulated ultrasound carrier signal has a fixed value of the amplitude as a result of its frequency modulation.

Another known method for underwater signalling between watercraft, in particular also for telephony operations, is based as well on the problem that conventional radio signalling techniques cannot be applied because of the bad transmitting capacity of water for electromagnetic waves (J. Matauschek "Einführung in die Ultraschalltechnik" VEB Verlag Technik Berlin, 2nd edition, August 1961, pages 318 to 320). Particularly, by this method information can be transmitted also between submarine boats travelling underwater. The known method is based on amplitude modulation of the ultrasound carrier signal with the information signal to be transmitted. Thus, in this method a certain amplitude swing of the ultrasound carrier signal corresponds to the information signal to be transmitted. In this connection the problem arises, however, that cavitation of the ultrasound-conductive medium, i. e. the tearing of it and the formation of small bubbles, occurs above a certain amplitude value of the ultrasound carrier signal, resulting in considerable disturbances of the transmission of the information signal. On the other hand, if the amplitude of the ultrasound carrier signal were restricted to a value below that cavitation limit, only a correspondingly limited amplitude swing would be available for modulation, so that in particular those portions of the information signal that correspond to an amplitude swing that is small in proportion to the maximal amplitude swing show a very bad signal distance from disturbances, which gets worse as the distance between the transmitter and the receiver grows.

The use of ultrasound for information transmission is, for instance, also known for television receiver remote-controls. With this application, however, only simple switch signals for channels and control signals for sound and picture adjustment have to be transmitted, so that the demands in connection with the transmission of any information signal whatever with a complicated and differenciated information content do not arise here at all.

The object of the invention is to define a method of the type mentioned at the outset which is improved as far as its range and security against disturbances is concerned, and an apparatus for carrying out this method, which are in particular suitable for underwater communication between divers.

As far as the method is concerned, this object is achieved according to the invention in that modulation of the ultrasound carrier signal with the information signal is performed as pulse duration modulation in which the pulse leading edges are modulated with the information signal and the fixed value of the pulse amplitude of the modulated ultrasound carrier signal is below the cavitation limit of the medium.

Thus, in the method according to the invention, the cavitation limit of the medium 'water' which serves for information transmission is approached only to a point necessary for the desired information transmission range. Thereby, an optimum of ultrasonic energy is on the one hand radiated, and the disturbing occurrence of cavitation is avoided on the other hand. Due to the type of modulation applied, where the information signal corresponds not to an amplitude of the ultrasound carrier signal but to the variation of the ultrasound carrier signal pulses in time which are formed by the pulse modulation, amplitude effects which might impair undisturbed transmission of portions of the information signal do not play a role. The information to be transmitted is radiated with an intensity below the cavitation limit of the medium, with the same maximum ultrasound intensity being available to all portions of the information signal during transmission. This results in a comparatively large range with high unsensitiveness to disturbances. Pulse modulation, i. e. simply switching on and off the emitted ultrasound carrier signal, thereby proves as surprisingly advantageous for information transmission over large range with small disturbance.

It has turned out that for instance at supersonic frequencies of 100 kHz and more ranges of some kilometers are possible. The method according to the invention therefore is particularly suitable for underwater communication of divers. But this application of the invention is not restricted to dry-divers in whose diving suits the necessary facilities for carrying out the method can be accommodated. For also wet-divers, i. e. sports divers, can be provided with suitable facilities like a necklace microphone or a mouthpiece adapted for speaking into it so as to be able to establish underwater speech contact by means of the method according to the invention. Another advantage lies in the fact that the angular extension of the sound field emitted by the transmitter can easily be adjusted by appropriately designing the ultrasound generator. Depending on the desired application, therefore both narrowly limited directional distances between transmitter and receiver and angularly extended sound fields can be built up. Another example of application of the method according to the invention is the transmission of measurement data delivered by sensors located in water to a processing station located outside the water, for example a drilling platform, yet having the receiver of the processing station also located in the water.

In this connection the used type of pulse duration modulation where the pulse leading edges are modulated with the information signal is particularly advantageous. This measure takes into account that the known ultrasound generators usually show a certain reverberation period so that the pulse leading edge of the ultrasound pulse has a better resolution than the pulse trailing edge.

The various types of pulse modulation are for instance described in E. Hölzler and H. Holzwarth "Theorie und Technik der Pulsmodulation", Springer-Verlag 1957. Among these types it is particularly simple to carry out pulse duration modulation in which the information signal is represented by pulses of a given frequency whose pulse duration corresponds to the scanned amplitude value of the information signal. For example, to form the pulse duration-modulated ultrasound carrier signal it is only necessary to compare the information signal with a saw-tooth signal of a positively given scanning frequency, while for demodulation in the receiver the electrical signal of the receiver, which corresponds to the pulse duration-modulated ultrasound carrier signal, has only to be smoothed in a low-pass filter for regenerating the information signal.

The security of the method according to the invention against disturbances is further improved in an advantageous embodiment in that the information signal is quantized. As is well-known, correctability and security against disturbances of the quantized information signal modulated then for transmission upon the ultrasound carrier is further increased through quantization, while the minor distortion of the information signal caused by the quantization remains negligible.

Although the method according to the invention is suitable for any type of information signals for the scanning of which a scanning frequency that is consistent with the time constant of available ultrasound generators is sufficient, the method according to the invention can advantageously be applied to the case where the information signal is a voice signal. At any rate, ultrasound generators whose time constant allows a scanning frequency sufficient for telephony purposes are easily available.

Thus, the method according to the invention improves the underwater transmission of messages which is not accessible to radio transmission. As it does not require any complicated appliances and because of its range it is particularly suitable for underwater communication between divers.

In particular, the scope of the invention also provides that both at the firs t place and the second place one transmitter and one receiver each as well as two ultrasound carrier signals of different frequency are provided, of which the one is used for transmission of information from the transmitter of the first place to the receiver of the second place and the other from the transmitter of the second place to the receiver of the first place. By using two ultrasound carrier signals of different frequency thus simultaneous information transmission can take place in both directions between the first and the second place. In particular, there is the possibility of full-duplex voice communication.

An apparatus for solving the problem that underlies the invention, comprising a transmitter having an ultrasound generator, means generating a drive signal serving for exciting the ultrasound generator to emit an ultrasound carrier signal of a given frequency and a modulator for generating a modulated fixed-amplitude ultrasound carrier signal by modulation of the drive signal with an information signal from an information signal source, and comprising a receiver having an ultrasound pick-up, a demodulator for the output signal delivered by the ultrasound pick-up and reproduction means for the demodulated output signal, is characterized in that the modulator and the demodulator is a pulse modulator and pulse demodulator, respectively, with a constant pulse amplitude modulating and demodulating, respectively, the pulse leading edges, and that the ultrasound generator and/or the ultrasound pick-up is provided with an ultrasound vibration-attenuating coupling layer at its ultrasound-radiation or pick-up surface, respectively.

By this attenuation layer, the reverberation of the ultrasound generator, which is due to the time constant, is strongly suppressed when its drive signal is switched off, which further improves the scanning resolution as well as the signal/noise ratio.

Besides, the apparatus according to the invention is essentially based on transmitting the information signal by ultrasound carrier signal modulation independent of the amplitude. The constant pulse amplitude of the ultrasound carrier signal pulses generated under the control by the modulator thus can be adapted to the desired range and can be set according to the range requirements up to a maximum value that just does not cause cavitation in the medium serving for information transmission. Thus, all those types can be taken into consideration as pulse duration modulators whose modulation is based on an influence on the rise time and fall time, respectively, of the leading edges of the pulse amplitudes while the pulse height remains unchanged. In addition, steps of quantizing the amplitude of the information signal and/or coding may be provided prior to modulation. Numerous designs of pulse modulators of this type with or without quantization or coding, respectively, are well-known. Such modules are particularly used in digital telephone networks where they are commonly known as "CODEC". Thus, the apparatus according to the invention can be realized by conventional, easily available modules.

The structure of such pulse length modulators or demodulators, respectively, is very simple. In the first one, merely the information signal has to be compared with a sawtooth signal of a fixed and sufficiently high scanning frequency so as to assign to each scanning amplitude of the information signal an ultrasound carrier signal pulse of a time period corresponding to the scanned amplitude. Out of this sequence of transmitted, pulse-duration modulated ultrasound pulses the information signal is then regenerated in the pulse duration demodulator by simple smoothing by means of a low-pass filter.

The advantages of a digital transmission of the information signal are obtained in a suitable development of the apparatus according to the invention in that an analog/digital converter is connected before the pulse length modulator and a digital/analog converter is connected after the pulse length demodulator. So the information signal is transmitted on the transmission path in a form quantized in correspondence with the assigned digital value which may be present in a coded form as is the case for example in pulse code modulation or also in delta modulation.

An embodiment of the apparatus according to the invention which is particularly suitable for voice transmission is characterized in that the transmitter comprises a microphone for delivering a voice signal representing the information signal. Thus the apparatus can directly be used for telephony operations. Then the reproduction means of the receiver accordingly comprises an electroacoustic transducer for reproduction of the demodulated output signal which represents a voice signal.

In particular, it is also provided within the scope of the invention that each of a transmitter and a receiver set to frequencies of the ultrasound carrier signals different from each other is arranged at the equipment of divers. This enables the divers to communicate with each other under water by means of the apparatus according to the invention in full-duplex voice communication. This arrangement of the transmitters and receivers is particularly simple in case of the equipment of dry-divers where transmitter and receiver can, for example, be arranged at the helmet or also at other appropriate parts of the equipment. The apparatus according to the invention is suitable also for sports divers who work with wet-diving equipment. Here differences exist with regard to the microphone which is connected to the transmitter, it is true. As wet divers are not prevented from speaking into the mouthpiece of their breathing mask, the microphone may, for example, be arranged there. Alternatively, the use of a necklace microphone would be possible, too.

Figure 1B:
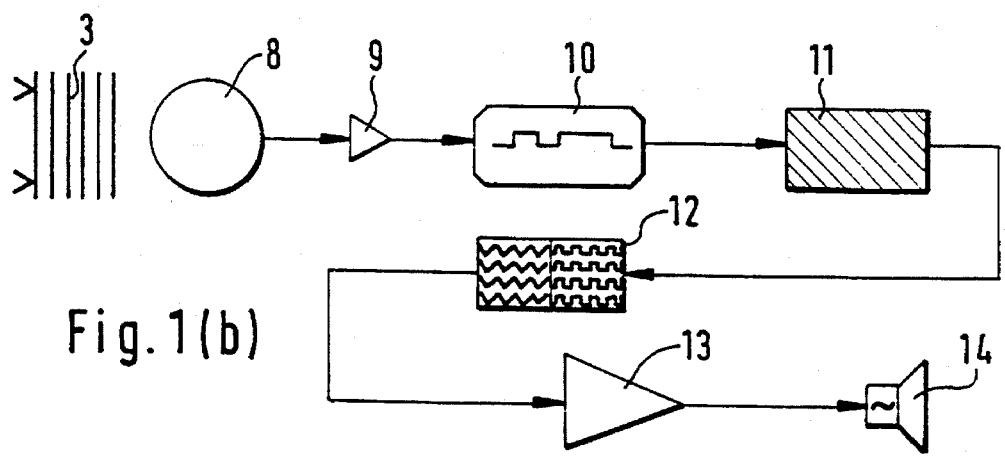
Figure 2A:
Figure 2B:
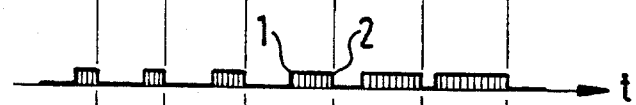
Figure 2C:
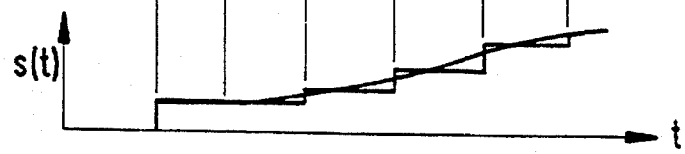

Further features, details and advantages of the invention will follow from the description hereinbelow and the drawing to which explicit reference is made with regard to any details that are not disclosed in the text but are essential to the invention. Herein, FIG. 1a and 1b show a block diagram of an apparatus for transmitting an information signal, and FIGS. 2a–2c illustrate of the operation of a pulse modulator provided in the block diagram of FIGS. 1a and 1b.

Figure 1A:
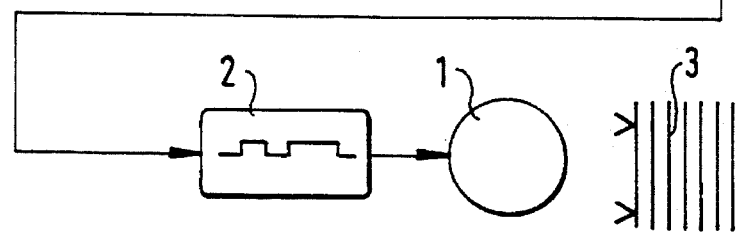

According to FIG. 1 (a), a transmitter shown there comprises an ultrasound generator 1 which is formed, for example, by a piezoelectric quartz disc provided with electrodes. A means 2 generating an electric drive signal for the ultrasound generator 1 is connected to the electrodes, by which the ultrasound generator 1 is excited to emit an ultrasound carrier signal, the frequency of which corresponds to the frequency of the electric drive signal. The electric drive signal is modulated with an information signal in the manner described hereinafter in detail, so that the ultrasound carrier signal 3 radiated by the ultrasound generator 1 shows a certain modulation.

In the illustrated embodiment the information signal is a voice signal generated by a microphone 4, which is digitalized after amplification in an amplifier 5 by an analog/digital converter 6. The voice signal quantized in the analog/digital converter 6 is converted in a pulse duration modulator 7 into a pulse duration-modulated ON/OFF signal for the driver means 2. Thereby the ultrasound carrier signal 3 of the ultrasound generator 1 is modulated in the form of ultrasound pulses having a pulse duration corresponding to the pulse duration of the modulation signal. In this, the pulse amplitude of the modulated ultrasound carrier signal remains the same and is set to a fixed value below the cavitation limit of the medium in which the modulated ultrasound carrier signal 3 propagates. This avoids the development of cavitation bubbles in the medium which occur above a certain amplitude value and would disturb information transmission.

The process of pulse duration modulation is explained in more detail by means of FIG. 2. As follows from FIG. 2 (a), the information signal $s_1(t)$, which for the sake of simplicity is represented here by an analog signal, i. e. without passing through the analog/digital converter 6, is compared in the pulse duration modulator 7 with a saw-tooth vibration whose frequency is selected to be high enough that a scanning density of the information signal $s_1(t)$ sufficient for the desired transmission quality is reached. By this scanning, a pulse duration-modulated signal illustrated in FIG. 2 (b) of a constant amplitude is created, with the leading edge of these constant-amplitude pulses each coinciding with the given zero-axis crossing time of the leading edge of the saw-tooth vibration and the trailing edge of the constant-amplitude pulses each being determined by the point of intersection of the rising edge of the saw-tooth vibration with the information signal $s_1(t)$. So the pulse duration of the pulse duration-modulated signal generated according to FIG. 2 (b) just corresponds to the currently scanned amplitude of the information signal $s_1(t)$. The pulse duration-modulated signal of FIG. 2 (b) then serves as switch signal for the driver means 2, so that the modulated ultrasound carrier signal 3 shows exactly the same pulse duration modulation.

As can further be seen from FIG. 1 (b), the pulse duration-modulated ultrasound carrier signal 3 transmitted by an ultrasound-transmitting medium acoustically coupled with the ultrasound generator 1 is picked up by an ultrasound pick-up 8 of a receiver which is acoustically coupled with the medium, and the ultrasound pick-up 8, just like the ultrasound generator 1, may be formed by a piezoelectric quartz disc provided with electrodes. The electrical output signal which occurs at the electrodes of the ultrasound pick-up 8 and corresponds to the received modulated ultrasound carrier signal 3 is amplified in a pre-amplifier 9 and subjected to pulse shaping in a downstream amplifier 10. In a demodulator 11 to which the output signal of the amplifier 10 is applied a digital demodulation signal is gained which corresponds to the digitalized output signal of the analog/digital converter 6 in the transmitter, which demodulation signal is converted in a digital/analog converter 12 into an analog signal corresponding to the information signal generated by the microphone 4 of the transmitter. The analog output signal of the digital/analog converter 12 is then sufficiently amplified in a power amplifier 13 so as to be made audible by an electroacoustic transducer 14, e. g. a loudspeaker or headphones, connected thereto.

The demodulation process is illustrated in FIG. 2 (c) again for the simpler case where no digitalization is performed. Then merely the pulse-formed signal received from the amplifier 10, which corresponds in its form to the signal of FIG. 2 (b), has to be smoothed by the demodulator 11 which is designed in the form of a low-pass filter, in order to recover according to the illustration of FIG. 2 (c) the signal form of the information signal.

As is well-known, ultrasound generators as well as ultrasound pick-ups have a certain time constant, which manifests itself in reverberation after switching off their excitation. That reverberation limits the resolution between the individual ultrasound pulses. Therefore, an ultrasound vibration-attenuating coupling layer may suitably be provided at least between the sound-radiating surface of the ultrasound generator 1 and the medium coupled with it. Thereby the undesired reverberation can largely be suppressed. The suppressing effect may be even increased in that the ultrasound pick-up is provided with a corresponding attenuating coupling layer on the receiver side, too.

When using the apparatus for full-duplex voice communication between divers, each diver is provided with a transmitter and receiver according to FIG. 2 (a) and (b), with the ultrasound generator 1 and the ultrasound pick-up 8 for example being arranged at the diving helmet or the diving mask in contact with the surrounding water. The frequencies of the ultrasound carrier signals of the transmitters are selected differently in order that one can speak simultaneously in both directions.

Aside from the aforementioned reverberation period which is due to the time constant, there is also a transient period because of the time constant, which however is smaller than the reverberation period. Therefore, the rising pulse edges, i. e. the leading edges, are better suited for modulation than the falling pulse edges. The ultrasound vibration-attenuating coupling layers simultaneously make attenuation of the transient period effects also possible.

List of Reference Numerals 1 ultrasound generator
2 driver
3 ultrasound carrier signal
4 microphone 5 amplifier
6 A/D converter
7 pulse duration modulator
8 ultrasound pick-up
9 pre-amplifier
10 amplifier
11 demodulator
12 D/A converter
13 power amplifier
14 electroacoustic transducer

I claim:

1. An improved method of transmitting an information signal under water from a transmitter located at a first place to a receiver located distant therefrom at a second place, wherein a modulated ultrasound carrier signal delivered to the water is formed with a fixed amplitude value in the transmitter by pulse duration modulation of an ultrasound carrier signal of a given frequency with the information signal, and the modulated ultrasound carrier signal picked up from the water is demodulated in the receiver for recovering the information signal, wherein the improvement comprises performing said pulse duration modulation so that the modulated ultrasound carrier signal is modulated in the form of ultrasound pulses having only the pulse leading edges thereof modulated with the information signal such that trailing edges of the ultrasound pulses remain temporally separated by a constant period, said ultrasound pulses having a pulse amplitude of said fixed amplitude value below the cavitation limit of the medium.

2. The method according to claim 1, characterized in that the information signal is quantized.

3. The method according to claim 1, characterized in that the information signal is a voice signal.

4. The method according to of claims 1, characterized in that both at the first place and the second place one transmitter and one receiver each as well as two ultrasound carrier signals of different frequency are provided, of which the one is used for transmission of information from the transmitter of the first place to the receiver of the second place and the other from the transmitter of the second place to the receiver of the first place.

5. An apparatus for carrying out the method according to claim 1, comprising a transmitter having an ultrasound generator, means generating a drive signal serving for exciting the ultrasound generator to emit an ultrasound carrier signal of a given frequency and a modulator for generating a modulated ultrasound carrier signal of a fixed amplitude by modulation of the drive signal with an information signal from an information signal source, and comprising a receiver having an ultrasound pick-up, a demodulator for the output signal delivered by the ultrasound pick-up and reproduction means for the demodulated output signal, characterized in that the modulator (7) and the demodulator (11) is a pulse length modulator and pulse length demodulator, respectively, with a constant pulse amplitude modulating and demodulating, respectively, the pulse leading edges, and that the ultrasound generator (1) and/or the ultrasound pick-up (8) is provided with an ultrasound vibration-attenuating coupling layer at its ultrasound radiation or pick-up surface, respectively.

6. The apparatus according to claim 5, characterized in that an analog/digital converter (6) is connected before the pulse length modulator (7) and a digital/analog converter (12) is connected after the pulse length demodulator (11).

7. The apparatus according to claim 5, characterized in that the transmitter has a microphone (4) for delivering a voice signal representing the information signal.

8. The apparatus according to of claims 5, characterized in that the reproduction means of the receiver has an electroacoustic transducer (14) for reproduction of the demodulated output signal representing a voice signal.

9. The apparatus according to of claims 5, characterized in that each of a transmitter (1 to 7) and a receiver (8 to 14) set to frequencies of the ultrasound carrier signals different from each other is arranged at the equipment of divers.

* * * * *